Oct. 2, 1923.

G. GOEBEL

1,469,557

CROWN FEEDING AND ASSEMBLING APPARATUS

Filed Aug. 26, 1919    7 Sheets-Sheet 2

Inventor:
George Goebel
by his Attys:

Oct. 2, 1923.

G. GOEBEL 1,469,557

CROWN FEEDING AND ASSEMBLING APPARATUS

Filed Aug. 26, 1919      7 Sheets-Sheet 3

Inventor:
George Goebel
by his Attys:
Philipp Sawyer Rice Kennedy

Oct. 2, 1923.

G. GOEBEL 1,469,557

CROWN FEEDING AND ASSEMBLING APPARATUS

Filed Aug. 26, 1919    7 Sheets-Sheet 7

Inventor:
George Goebel
by his Attys:

Patented Oct. 2, 1923.

1,469,557

UNITED STATES PATENT OFFICE.

GEORGE GOEBEL, OF BALTIMORE, MARYLAND, ASSIGNOR TO THE CROWN CORK AND SEAL COMPANY OF BALTIMORE CITY, OF BALTIMORE, MARYLAND, A CORPORATION OF MARYLAND.

CROWN FEEDING AND ASSEMBLING APPARATUS.

Application filed August 26, 1919. Serial No. 319,932.

*To all whom it may concern:*

Be it known that I, GEORGE GOEBEL, a citizen of the United States, residing at Baltimore, State of Maryland, have invented certain new and useful Improvements in Crown Feeding and Assembling Apparatus, fully described and represented in the following specification and the accompanying drawings, forming a part of the same.

This invention relates to apparatus for feeding and assembling bottle closures of the "crown cork" type.

One recognized form of crown cork comprises a metal shell or crown having a flaring skirt which is locked to the bottle, a sealing disk of cork or the like, and a binding disk of adhesive material for securing the sealing disk in place. In making closures of this type, according to one method, the shell, binding disk and sealing disk are assembled, the assembled crown is heated to soften the adhesive material, and the crown is subjected to pressure and a cooling medium. It is to apparatus for assembling crowns of the type mentioned that the present invention relates.

The invention in its entirety also relates to the feeding of crowns in its broadest aspect, that is, whether the term crown refers to an empty shell or an assembled closure.

It is the principal object of the invention to provide apparatus of the type mentioned that operates effectively and accurately at high speed and makes quantity production commercially practical.

With this general object in view, the invention consists in the combinations, arrangements of parts and details of construction which will first be described in connection with the accompanying drawings and then more particularly pointed out.

As is more fully described hereinafter, in the apparatus illustrated as an example, crown shells supplied to a hopper in a mass are selected to be uniformly and properly faced. The selected shells are then delivered to a step-by-step feeding mechanism which conducts them beneath paper inserting mechanism, cork inserting mechanism, and crown bumping mechanism. Finally, the assembled crown is delivered to a heating and cooling wheel.

Referring to the drawings, selecting means is provided for delivering the crown shells uniformly and properly faced. As here illustrated, as an example, the crown shells are supplied in a mass to a hopper 15. This hopper has a slanting bottom 16 and a partial partition 17 so that the crowns move toward the back and bottom of the hopper. The hopper is bolted or otherwise secured to an upright 18 supported by a housing 19 carried on the base 14.

The hopper body is open at the back and forming a back enclosure therefor is a rotating plate 20 mounted on a shaft 21 journalled in a bearing bracket 22 suspended from the hopper. Shaft 21 is rotated by a pulley 23 connected by a belt 24 with a second pulley 25 driven by a shaft 26. Mounted on this latter, to rotate the same, is a worm gear 27 meshing with a worm wheel 28 on a vertical shaft 29. Shaft 29 is driven by means of a gear 30 meshing with a pinion 31 mounted to rotate with a bevel pinion 32 which meshes with a similar gear 33. This latter is mounted on a main drive shaft 34 to which power may be applied in any suitable manner.

Figures 1, 5:
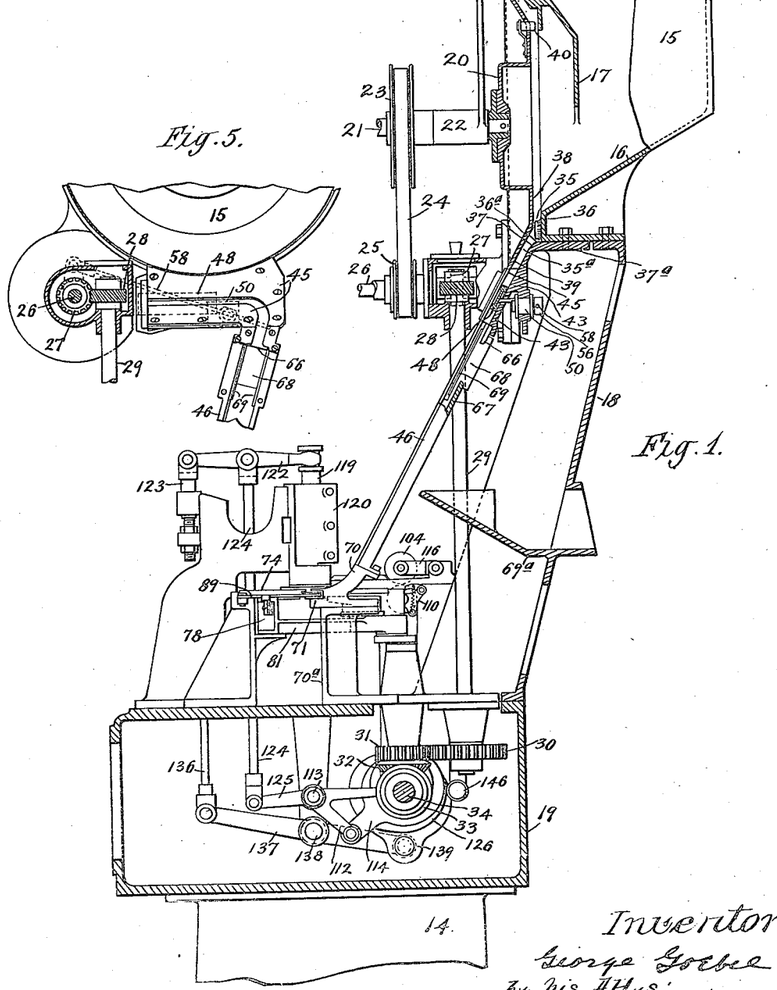
Figure 1 is a view in vertical section of an apparatus constructed in accordance with the invention, showing particularly the hopper and crown selecting mechanism.
Figure 5 is a detail view in vertical section of a portion of the hopper and associated parts.

Between the hopper body and its back plate 20 is a space which may be called a separator way. This separator way includes a primary channel 35 and a secondary channel 35ª. These channels are formed by the hopper and back plate as follows: The hopper has, at the back, an annular rim or face 36 terminating in an abrupt ledge or shelf 36ª, beyond which is an outwardly inclined surface 37. As appears in Fig. 1, the bottom portion of the shelf 36ª and surface 37 are formed by a separate extension 37ª bolted to the hopper, but this is for convenience of manufacture, and the extension piece may be considered as part of the hopper body. The back plate 20 has a face portion 38 so disposed with relation to the face 36 of the hopper that the intervening space permits the passage of crowns in single edgewise position but not in diskwise position or in dual edgewise relation. Extending outwardly to substantially parallel the surface 37, the plate 20 has an inclined rim 39. At the bottom, the rim of the secondary channel 35ª is cut away to provide a hopper delivery mouth hereinafter referred to.

Crowns sliding down the lower part of the hopper enter the primary channel 35 of the separator way where they take an upright position indiscriminately faced. In the case of inwardly faced crowns, the skirts lodge on the ledge 36 as appears in Figs. 1 and 4, and the crowns are arrested thereby. Outwardly faced crowns, however, slide past the ledge without being arrested and enter the secondary channel 35ª. Here they eventually reach the delivery mouth through which they pass out.

To elevate the crowns in the separator way, at a plurality of locations in the rotating plate 20 there are provided spring pressed studs 40 which extend into the primary channel. As the back plate rotates, the arrested crowns in the primary channel are carried around the separator way until they reach a point where they can drop back into the mass. Thus, only properly faced crowns can reach the delivery mouth of the hopper. It will be understood that any other suitable means for selecting or facing crowns may be employed.

There is provided in connection with the hopper a delivery mouth of a capacity to deliver a plurality of crowns simultaneously and a magazine for receiving the delivered crowns. Although capable of various constructions, as shown, opening downwardly from the secondary channel of the separator way is a delivery mouth formed by cutting away the channel rim. In the present instance, this hopper delivery mouth is represented by the space between the points 41, 42 and has a capacity of four crowns. That is to say, any number of crowns, up to and including four may simultaneously pass out from the hopper separator way.

Below the delivery mouth is a magazine for receiving the delivered crowns. As shown, the extension part 37ª which provides the inclined surface 37 of the separator way is extended downwardly to form a back wall 43 for the magazine. At the bottom of this wall is a thickened portion providing a magazine bottom 44. The magazine is provided with cover plates 45 separated slightly, as appears in Figs. 4 and 5, to provide a view of and access to the crowns in the magazine. It will be seen from the drawings that the surface 37 of the separator way and the wall 43 of the magazine form a continuous supporting surface down which the crowns slide until they rest on the bottom ledge 44.

Figure 2:
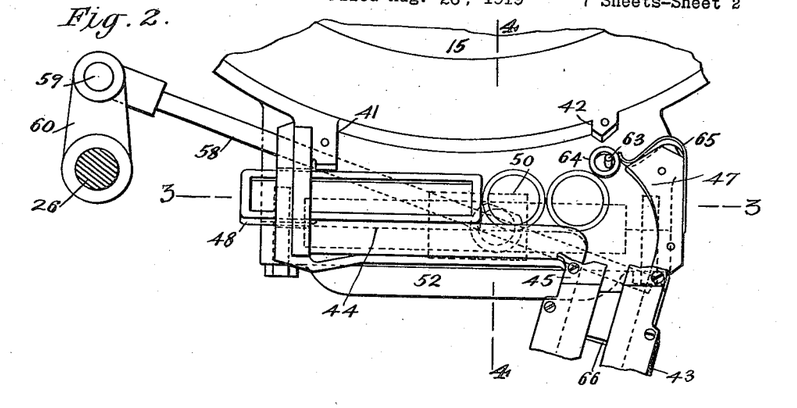
Figure 2 is a view in elevation, with parts removed, of a part of the crown feed.

There is provided crown conducting means leading away from the magazine and such means may take the form of a gravity-feed chute. In the present embodiment, at one end of the magazine, the bottom rib 44 (Fig. 2) curves sharply downward to join a gravity feed chute 46, more fully described hereinafter. Opposite this end of the rib 44 is a block 47 secured to the plate 37ª, which forms an end wall for the magazine and which has a curved edge, as appears in Fig. 2, serving to aid in guiding the crowns into the chute.

Figure 3:
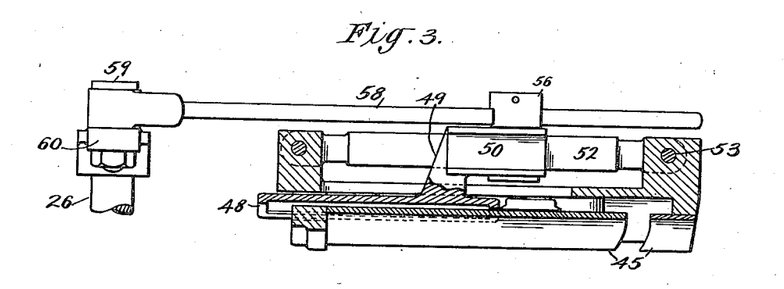
Figure 3 is a sectional view taken on the line 3—3 of Fig. 2.
Figure 4:
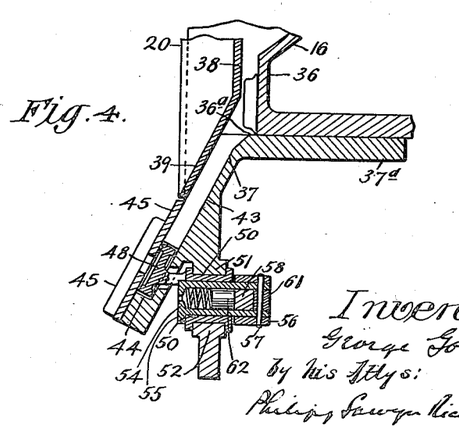
Figure 4 is a similar view taken on the line 4—4 of Fig. 2.

Means is provided for causing the crowns in the magazine to move into the chute. This may be accomplished, as an example, by a pusher reciprocating through the magazine to push the row of collected crowns into the chute. Although capable of various constructions, as here shown, slidable through the magazine is a pusher 48 of the form shown in Figs. 2–4. This pusher is supported, by means of an integral arm 49, from a slide block 50, the arm 49 passing through a suitable slot formed in the back wall of the magazine. The top and bottom of the slide block 50 are rabetted, as shown in Fig. 4. The top slides on a lug 51 formed on the back plate 44 and the bottom slides on a track member 52 suspended by bolts 53.

The slide block 50 is driven in a manner to permit the pusher to yield in case a jam of crowns occurs. To this end, as here shown, inserted in the slide block is a tubular connecting member 54, held in place by a flange 55 and a collar 56, the collar being pinned to member 54 by pin 57. Passing through collar 56 and the connecting member 54, is a driving rod 58, squared at that portion which passes through member 54 (Fig. 4). This driving rod is mounted on the pin 59 of a crank 60 rotated by shaft 26.

To yieldably connect the driving rod with the slide block 50, the rod is frictionally held to the connecting member 54. To this end, as here shown, the squared portion of rod 58 is embraced between a plug 61, held in place by pin 57, and a spring pressed block 62 slidable in the tubular connecting member 54. Under normal conditions, as the rod reciprocates the friction of the parts described causes the slide block 50 to move with the driving rod, thus reciprocating the pusher in the magazine. In case, however, the pusher encounters an excessive resistance, as in the case of a jam of crowns, the friction mentioned is overcome, thus permitting the driving rod to slide through connecting member 54 without moving the latter. As a result, the pusher remains idle until the obstruction is removed.

To prevent the row of crowns from buckling upwardly as they are pushed toward the chute, yieldable guiding means is provided. As shown in the present exemplification, mounted on a pin 63 is a ring 64 normally held in position by a leaf spring 65. This ring is positioned to guide the crowns downwardly into the chute and it can yield by moving on the pin against its spring.

With the construction described, the pusher being withdrawn, crowns up to four in number drop into the magazine and are collected by the bottom rib 44. The rotation of shaft 26 causes the pusher 48 to advance through the magazine, thus pushing the collected crowns toward the chute into which they drop, guided by end plate 47 and ring 64. By the time the rotation of shaft 26 has withdrawn the pusher, another lot of crowns has accumulated for delivery and the operation continues. This construction makes possible an effective and rapid feed of the crowns.

As will be apparent from the drawings (Figs. 1 and 4, for example), the chute 46 is positioned at an angle to the vertical. In order to deliver only proper crowns to the assembling mechanisms, there is provided a discharge opening in the chute and means for conducting proper crowns past such opening. Although capable of various constructions, in the present embodiment, the top part of the chute body is formed by downward extensions from the back wall 44 and the end piece 47 of the magazine. Set into the rabbetted ends of these extensions (Fig. 1) is a plate 66 forming a part of the chute floor in alignment with the floor 67 of the chute proper, but separated therefrom by a space 68. Considering the chute as a whole, this space 68 is a discharge opening formed in the floor of the chute. To conduct proper crowns past the discharge opening, along each side of the opening is a ledge or guide rail 69. These ledges are so spaced as to serve as bearing surfaces for the skirts of proper crowns, but the space between them cannot be spanned by a defective crown, such as one with a bent or defective skirt. With this construction, therefore, defective crowns upon reaching the opening 68 will, by gravity, drop out of the chute and will fall into a collecting receptacle 69$^a$. Proper crowns, however, being able to span the space between the ledges 69, will pass the discharge opening and slide down the chute. Certain features of the above described crown feeding mechanism are claimed in a divisional application Serial No. 433,965.

Figures 8, 12:
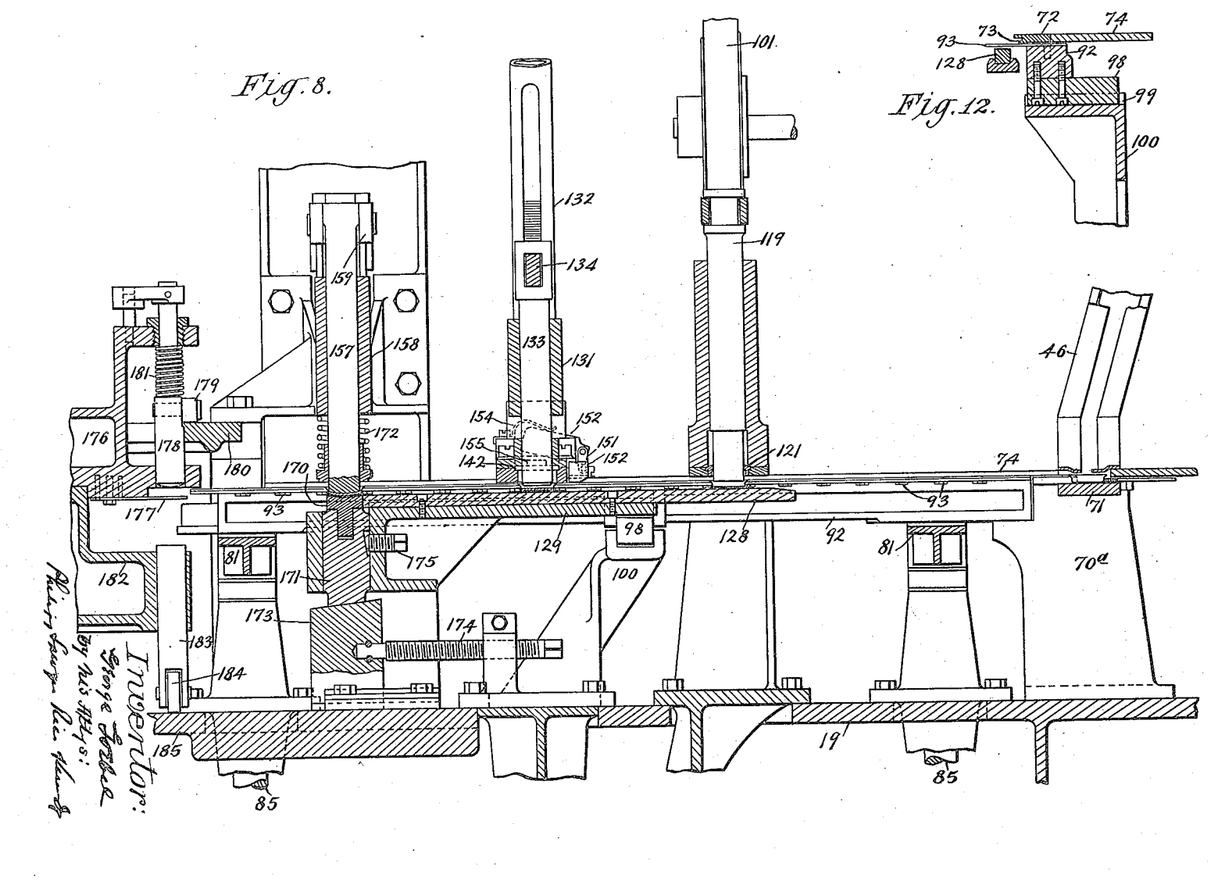
Figure 8 is a view in vertical section of the parts shown in Figs. 6 and 7.
Figure 12 is a similar view taken on the line 12—12 of Fig. 9.

The foot of the chute 46 (Figs. 1 and 8), as here shown, is a separate piece 70 supported by a bracket 70$^a$ on the housing 19. This foot piece comprises a curved passage at the mouth of which is a receiving table 71 onto which the crowns emerge from the chute in an inverted or upwardly facing position.

From this table the crowns are transported beneath the various uniting mechanisms. As hereinafter more fully appears, the several mechanisms include vertically reciprocating plungers and provision is made for accurately positioning the crowns beneath these plungers.

Figure 6:
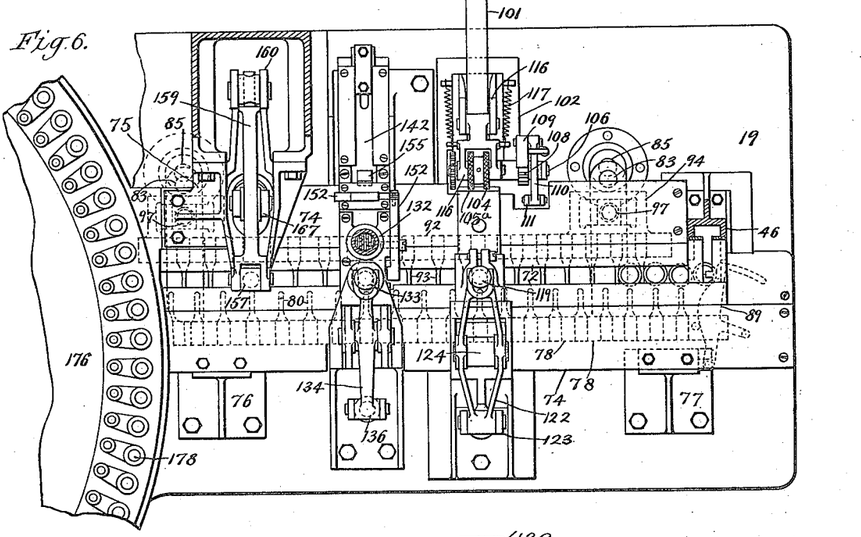
Figure 6 is a top plan view of the apparatus, with parts shown in section.

There is provided crown supporting and guiding means which may conveniently take the form of a track comprising parallel guide rails in which the crowns may be suspended by their skirts. Although capable of various constructions, in the form here shown, extending away from the receiving table 71 are a pair of guide rails 72. The opposing edges of the rails 72 are undercut to form oblique ledges 73 formed at an angle to receive the skirt of an upturned crown. The guide rails are spaced apart in accordance with the crown diameter, so that the crowns may be suspended from the rails in a manner to be movable therealong. The guide rails are supported by means of a number of clips 73$^a$ to which they are secured, the clips, in turn, being secured to two cover plates 74. These cover plates are carried by a number of brackets extending upwardly from the housing 19. Thus, the upper cover plate (Fig. 6) is supported on the bracket 70 and a bracket 75, while the other cover plate is carried by brackets 76, 77.

The invention in its entirety includes means for simultaneously feeding a plurality of crowns along the guiding track with a step-by-step movement. This may be accomplished, for example, by a plurality of spaced feeding fingers which are moved in such a manner that a given crown is successively fed ahead by each finger.

Although capable of various constructions, in the embodiment here illustrated, beneath the left hand or lower cover plate 73 is a long supporting bar 78 having a bearing on shelves 79 extending inwardly from the brackets 76 and 77. Secured to this supporting bar at spaced intervals are a plurality of thin, narrow fingers 80 of the form clearly shown in Figs. 9 and 11. These fingers are spaced apart substantially the diameter of a crown body, so that a suspended crown may lie between each adjacent pair of fingers.

Figure 7:
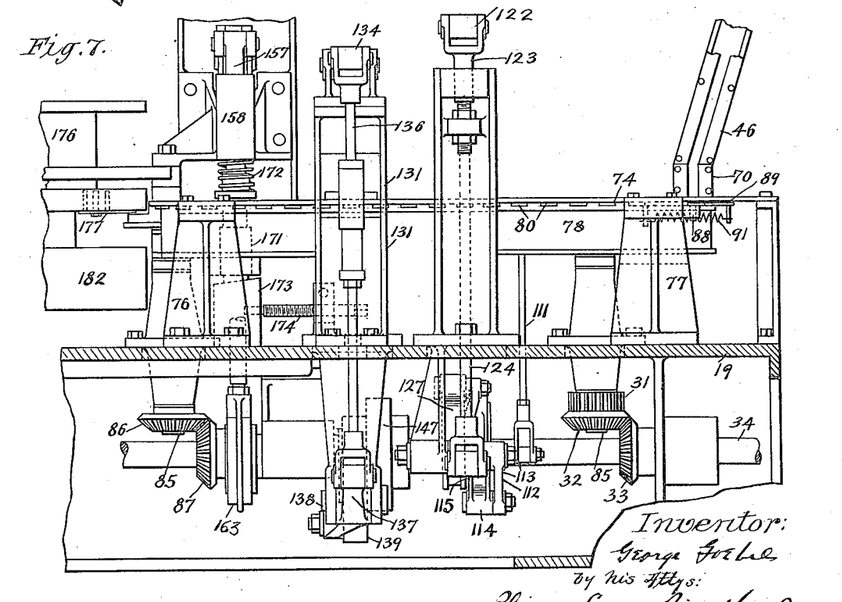
Figure 7 is a side elevation of the parts shown in Fig. 6.

To give the feeding fingers the necessary motion to progressively feed the crowns, they are given an orbital movement which may advantageously be circular. This may be accomplished, for example, by connecting the finger supporting bar with a rotating crank arm. Although capable of various constructions, as shown, near each end of the supporting bar is a web 81 which connects the bar (Figs. 9 and 11) with a block 82. In each block 82 is pivoted a crank pin 83 on a crank arm 84 which is mounted on a vertical shaft 85 (one of these shafts being shown in Fig. 11). This shaft 85 is driven by means of a bevel pinion 86 mounted thereon and meshing with a similar gear 87 on the main drive shaft 34. The other shaft 85 is driven by the gear 32 (Fig. 7).

With the construction described, the supporting bar 78 and its crown feeding fingers will be given a circular motion, that is, a motion such that any point thereon describes the circumference of a circle. It will be clear from the drawings that the fingers are so located that they extend into the path of the caps during a portion of their cycle. By the movement described, a given crown is engaged from the rear by a feeding finger, pushed ahead, and released during one cycle. The next cycle brings the next finger behind the crown to feed it forward. Thus, a given crown is successively fed by each finger during successive cycles, and a plurality of crowns are simultaneously fed forward during each cycle.

To shift the crowns delivered to the receiving table 71 onto the track and into the reach of the feeding fingers, an oscillating pusher is provided, this pusher being driven in synchronism with the movement of the fingers. Although capable of various constructions, as here illustrated, pivoted on a lug 88 extending out from bracket 77 so as to extend over table 71 is a crown pushing arm 89. To cause this arm to oscillate in a cycle synchronous with the cycle of the feeding fingers, the arm is provided with a curved edge 89$^a$ in the nature of a cam. This cam edge is engaged by a roller 90 mounted on the supporting bar 78, the arm being held to the roller by a spring 91. By the combined action of the roller and the spring, the pusher arm 89 will oscillate once for each cycle of the feeding fingers, thus pushing a crown from the receiving table to the track for each stroke of the fingers. Thus, while the end finger is feeding forward the last crown delivered, the pusher arm is moving a new crown into position to be taken by the finger on its next cycle.

It will be noted that the construction described permits the pusher arm to yield in case a jam occurs.

In order to prevent crowns from leaving the chute during the forward stroke of the pusher arm, means is provided for cutting off the flow of crowns in synchronism with the pusher's stroke. Although capable of various constructions, as here shown, on the end of the pusher arm is a stop member 89$^a$ positioned to be drawn across the mouth of the chute as the pusher oscillates. When the pusher is moved forward the stop member 89$^a$ blocks the mouth of the chute and no crown can emerge until the pusher withdraws to the proper position.

In order to present the crowns to the operating plungers in properly aligned and spaced positions, provision is made for controlling the feeding movements of the crowns. To this end there is provided, in connection with the step-by-step feed, means for limiting and equalizing the feeding movements. This may be accomplished, for example, by a plurality of arresting fingers intermittently interposed into the path of the crowns in synchronism with the movement of the feeding fingers. Although capable of various constructions, in the present embodiment, opposite and parallel to the supporting bar 78 is a second supporting bar 92 to which are secured a plurality of spaced fingers 93. These fingers are like the fingers 80 and are similarly spaced, that is, so that a crown body substantially fits in between each adjacent pair. The two sets of fingers are so related (as appears in Fig. 9) that in the initial positions of the feeding fingers the fingers of one set are staggered with relation to those of the other set, the distance of half a space.

To reciprocate the arresting fingers in synchronism with the movement of the feeding fingers, the supporting bar 92, as here illustrated, is connected with the feeding drive and the circular motion thereof is changed to reciprocating motion. In the present exemplification, near each end of the supporting bar 92 is an offset extension plate 94 having a slot 95 formed therein. Riding in each slot is a block 96 in which is pivoted a pin 97 each pin being mounted in one of the blocks 82. To keep the supporting bar in a true path, secured to the bar is a block 98 sliding in a guide track 99 formed on a bracket 100.

With the construction described, the rotary movement of the crank arms is converted into reciprocating motion in the arresting device and for every orbital cycle of the feeding fingers the arresting fingers make a reciprocating cycle. Since both the feeding fingers and the arresting fingers are operated by the crank arms, their respective cycles are in true synchronism.

Figures 9, 10, 11:
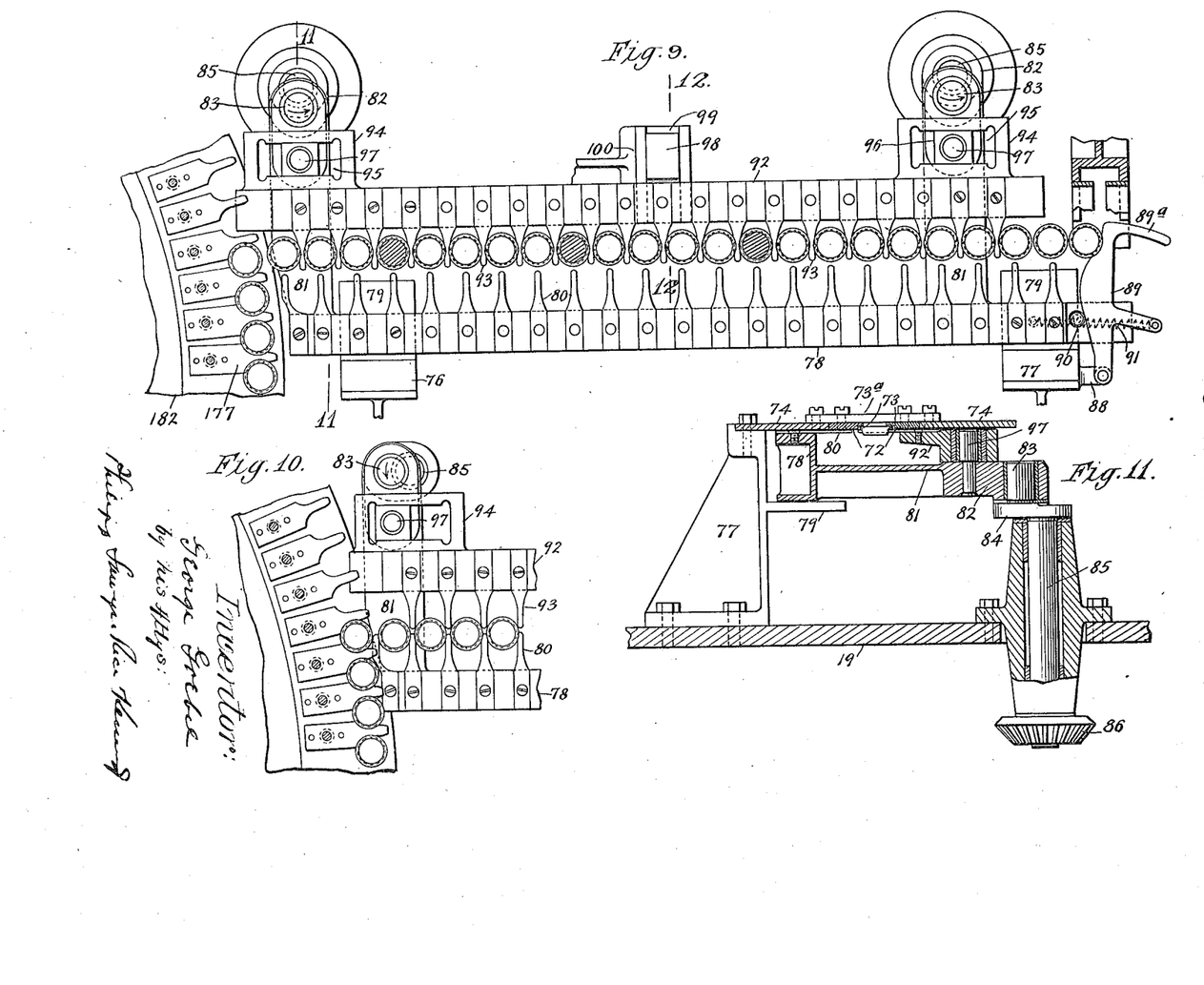
Figure 9 is a top plan view of the crown feeding mechanism with parts removed.
Figure 10 is a similar view showing a part of the feeding mechanism at a different position of the feeding movement.
Figure 11 is a sectional view taken on the line 11—11 of Fig. 9.

It will be seen that the arresting fingers intermittently move forward into the path of the crowns, each finger passing between two adjacent crowns. Since the fingers are spaced apart substantially the diameter of that part of the crown engaged by them, this interposition of the fingers arrests the crowns and prevents further forward movement or any accidental backward movement. Such a position of the parts is shown in Fig. 9. Also, since the feeding fingers are similarly spaced, the crowns cannot be accidentally displaced from their proper position during feeding. That is to say, while the crowns are moved along the track they are embraced between adjacent fingers and can move only in accordance with the predetermined feeding stroke of the fingers. The parts are so arranged that the arresting fingers come into operation as the feeding fingers leave so that the feeding movements of the crowns are positively and accurately limited and equalized.

Figure 9 shows the feeding fingers drawn back, that is, in what may be termed initial position, the arresting fingers being at the forward end of their stroke. As the crank arms rotate (in the direction of the arrow), during the first quarter of the cycle the feeding fingers move around to take a position behind the crowns they are to feed, the arresting fingers meanwhile starting to withdraw. At the end of the quarter cycle the fingers of the two sets are in alignment, the arresting fingers just on the point of withdrawal, the feeding fingers just on the point of starting to feed. During the second quarter of the cycle, the arresting fingers continue to withdraw out of the way, the movement of the feeding fingers sliding the crowns forward on the track. During the third quarter, the feeding fingers are still moving the crowns forward and the arresting fingers are advancing again. At the end of the third quarter, the two sets of fingers are again in alignment (as shown in Fig. 10) the feeding fingers on the point of leaving, the arresting fingers on the point of engaging the crowns to arrest the same. During the last quarter of the cycle the feeding fingers return idly to initial position and the arresting fingers complete their stroke. It will be noted that during the first and last quarter of the cycle, the arresting fingers, although moving, are preventing the crowns from movement since the fingers move at right angles to the crown's path. As appears in Fig. 10, when the two sets of fingers are in alinement their opposing ends are close together. With the construction described, the arresting fingers arrest the crowns as soon as the feeding stroke of the feeding fingers has come to an end, and terminate their arresting function only at the time when the next feeding stroke begins. As a result, the crowns are always under the control of one set of fingers or the other and are never free to be displaced accidentally.

Between the feeding movements of the crowns and while they are held stationary by the arresting fingers, the several operations now to be described take place.

Figure 13:
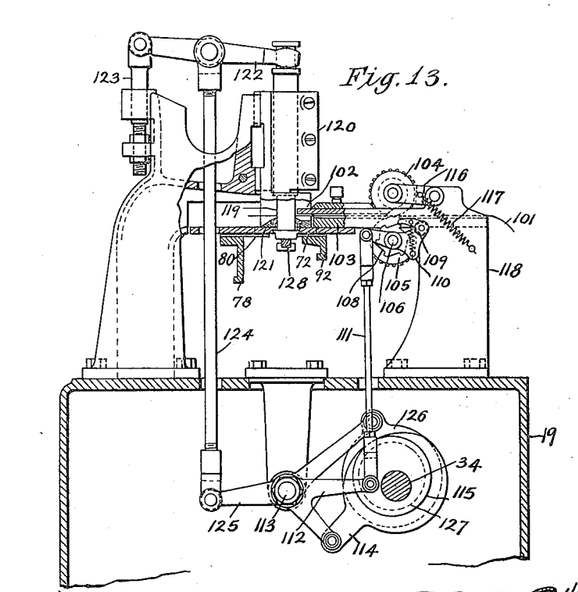
Figure 13 is a transverse sectional view showing the paper feeding mechanism.

There is provided means for automatically cutting a disk of adhesive material and inserting it in a crown. This may be accomplished, for example, by a plunger which cuts a disk from a strip and by the same stroke inserts it in the crown. Although capable of various constructions, in that shown, a strip 101 of impregnated paper is fed from a reel (not shown) between guide plates 102, 103, which lead it in a path transverse the path of the crowns. Above and below the paper strip are two feed wheels 104, 105, each having two knurled paper-engaging rims 105ª. The lower wheel 105 is on a shaft 106 driven by a ratchet 108 and pawl 109 to give the strip an intermittent feed. The pawl is mounted on a lever 110 and is spring held to its duty. The pawl lever 110 is operated by a pull rod 111 connected to one arm of a bell crank lever 112 pivoted on a stud 113. The other arm of the bell crank lever is connected to a strap 114 on an eccentric 115 rotated by the main drive shaft 34. The upper feed wheel 104 is hung on arms 116 and is held down to the positively driven feed wheel by springs 117 secured to the supporting bracket 118.

As here shown, the disk cutting and inserting plunger 119 is slidable in a bracket 120, its lower end passing through a cutting die 121. To reciprocate the plunger, it is connected to a lever arm 122 fulcrumed on an adjustably mounted stud 123 and connected to a pull rod 124. This pull rod is operated by a bell-crank lever 125 to one arm of which it is connected. The other arm of the bell-crank lever is connected to a strap 126 on an eccentric 127 rotated by the main drive shaft 34.

As the plunger 119 is drawn down, its engagement with the die 121 cuts a disk from the strip 101 and the further stroke of the plunger deposits the disk in the waiting crown, which is held stationary at that particular time, in the manner above described. When the plunger has withdrawn, the strip 101 is fed forward one step in readiness for the next stroke of the plunger. The perforated strip may be removed by being wound on a reel (not shown).

In order to prevent the crowns from being damaged or dislodged under the pressure of the operating plungers, a support is provided. As shown, underneath the center of a portion of the crown track is a supporting bar 128 carried by a bracket 129. This bar 128 is beveled off slightly near its forward end (see Fig. 8) in order that the crowns can readily pass above the same as they are fed forward.

Figure 14:
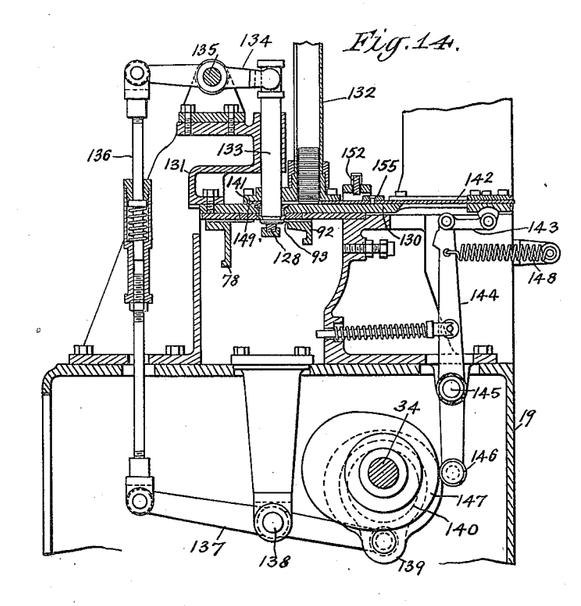
Figure 14 is a similar view showing the cork feeding mechanism.

There is provided means for inserting a cork disk or the like in a crown. This may be accomplished, for example, by an inserting plunger and a slide for feeding the disks thereto. As here illustrated, positioned over a table 130 carried by a bracket 131, is a cork reservoir tube 132. This tube terminates above the table a distance substantially equal to the thickness of one cork disk. The cork inserting plunger 133 is slidable in a part of the bracket 131 and is connected to a lever 134 fulcrumed on a stud 135. The lever is oscillated by a pull rod 136 connected to a lever arm 137 fulcrumed at 138. The other end of lever arm 137 is connected to a strap 139 on an eccentric 140 rotated by the main line shaft 34.

The lower end of the plunger 133 passes through a die collet 141 in the table 130 and cork disks are fed to a position above this die. To this end, slidable on the table 130 is a cork pusher 142 connected by a link 143 with a lever 144 fulcrumed as at 145. This lever is operated by means of a roller 146 running on a cam 147, the roller being held to its duty by a spring 148.

As the pusher 142 moves forward its end engages the bottom cork disk and pushes it to a position over the die collet, this position being determined by a stop plate 149. The descending plunger pushes the cork disk through the collet and deposits it in the crown shell, which is held stationary as before described. As the pusher withdraws the pile of disks drops down for the next cycle. The reservoir tube may be kept supplied with cork disks in any suitable manner.

Figure 15:
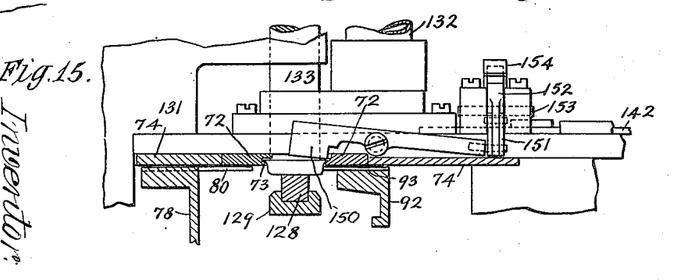
Figure 15 is a transverse view, partly in section and partly in elevation, showing cutout mechanism for the cork feed.
Figure 16:
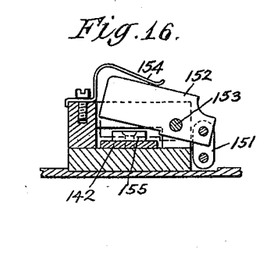
Figure 16 is a detail view showing in cross section a portion of the parts shown in Fig. 15.

Means is provided for preventing the operation of the cork feeding means in case no crown shell is presented to receive a disk. Although capable of various constructions, as here illustrated, over the crown path on the near side of the cork feeding plunger, is a crown detector in the form of a weighted lever arm 150. Its weighted end is positioned above the crown path and its inner end is connected to a link 151 connected in turn with a latch 152. This latter is pivoted on a pin 153 and is normally pressed downwardly by a leaf spring 154. Cooperating with the latch 152 is a stop block 155 secured to the cork pusher 142. When the pusher is advanced, should latch 152 drop down it would take a position behind the stop block and prevent withdrawal of the pusher. As long as crowns are presented to the detector 150 the weighted arm is elevated by the crowns, as in Fig. 15, and this position of lever 150 holds the latch 152 up against its spring and in inoperative position. Should a crown fail to be presented, however, the weighted end of the lever 150 drops down, thus allowing the latch 152 to drop. At this time the pusher 142 is advanced on the feeding stroke for the previous crown. Consequently, on the next cycle, when the empty space has reached cork receiving position, there is no cork fed. As soon as the next crown reaches the detector, the latter is elevated again, thus raising the latch and freeing the pusher, which can then withdraw to feed a cork disk as the crown mentioned moves to receiving position.

Figure 17:
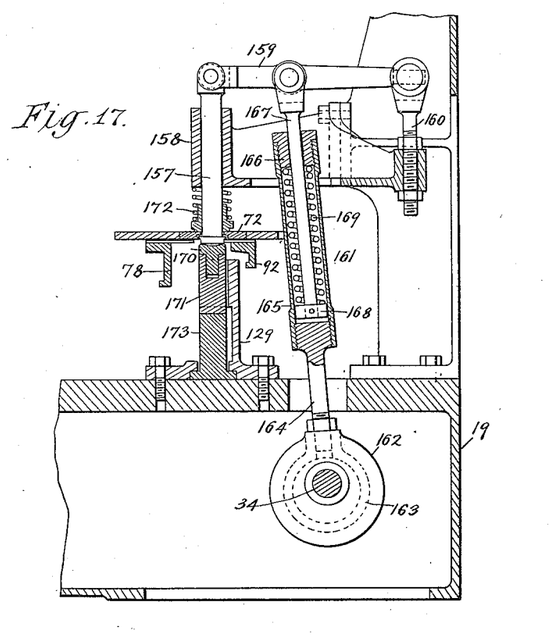
Figure 17 is a transverse sectional view showing the cork bumping mechanism.

The crown shell has now received its disk of adhesive material and its cork sealing disk. Means is provided for pressing the disks firmly into the shell and for giving the shell a slightly convexed top, this operation being termed "bumping" the crown. This may be accomplished by a plunger for pressing the crown against a concave die. As here shown, beyond the cork feed is a bumping plunger 157 sliding in a bracket 158. The plunger is operated by a lever 159 fulcrumed on an adjustably mounted stud 160. The lever is oscillated by a pull rod 161 connected to a strap 162 on an eccentric 163 rotated by the main drive shaft 34.

In order to avoid excessive pressure on the crowns, the pull rod, designated generally as 161, is constructed to compensate for the presence of more than one cork disk, or foreign matter, in the crowns presented to plunger 157. To this end, the lower connecting rod 164 has threaded thereon a tubular casing 165, into the other end of which is threaded a plug 166. Slidable through the plug and extending into the casing is the upper connecting rod 167. On the end of the latter is pinned a collar 168 and between this collar and plug 166 is a coil spring 169. With this construction, should the plunger encounter abnormal resistance it can yield.

Figure 18:
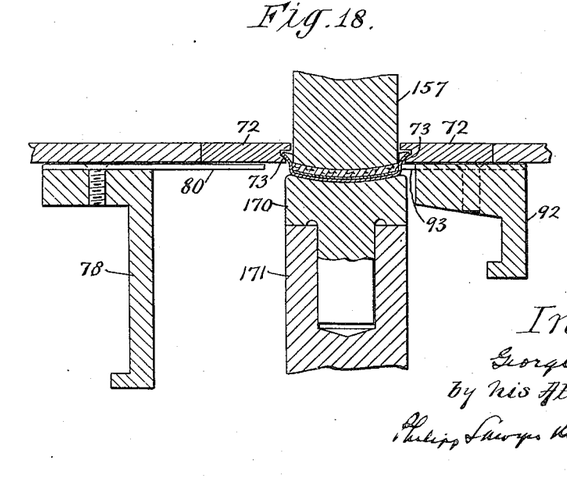
Figure 18 is an enlarged view of a portion of Fig. 17.

The end of the plunger 157 is slightly convex and below the same is a correspondingly concaved die block 170 set in a supporting block 171. As the parts operate, the plunger 157 descends into the crown and presses the same against the die block 170. This pressure drives the paper disk and sealing disk tightly up into the crown and at the same time gives the top of the crown a slightly convexed form (see Fig. 18). As the plunger rises, any tendency of the crown or the disks to adhere to the plunger is prevented by a spring pressed collar 172.

In order to adjust the pressure brought to bear on the crowns, the position of the die block 170 is adjustable. To this end, supporting block 171 is slidable in part of bracket 129 (see Fig. 8) and has an inclined bottom resting on a wedging block 173. This block may be moved back and forth by a threaded rod 174. Movement of block 173 causes the supporting block 171 to be raised or lowered. It is secured in adjusted position by a set screw 175.

It will be understood that during each cycle of the crown feeding mechanism, there is a simultaneous operation, on three different crowns, of the paper inserting, cork inserting, and crown bumping devices. These three crowns are the shaded crowns in Fig. 9. Thus, during one cycle, the first crown is receiving the paper disk, the second crown the cork disk, and the third crown is being bumped. The operating parts are so synchronized that the three plungers carry out their operations during that part of the feeding cycle when the crowns are stationary, and with the feeding mechanism before described, the crowns are always presented to the plungers properly spaced and aligned.

From the bumping plunger, the assembled crowns are fed forward to the end of the track. In the present embodiment rotating past the end of the track is the heating, pressing and cooling dial. Secured to an upper rotating spider 176 are a plurality of radially disposed crown supporting fingers 177. These fingers are so spaced apart that between each two a crown may lie suspended. The spider 176 is rotated in any suitable manner and it is so situated with respect to the feeding track that the feeding movement of the final finger 80 moves the end crown into the embrace of two adjacent fingers 177. Slidable in a part of spider 176 are a number of pressure plungers 178, one for each crown. These plungers each have a roller 179 running on a cam track 180 to elevate the plunger for reception of the crown. As that particular plunger passes on from crown receiving position, the roller rides down the depressed portion of the cam and the plunger descends, under force of a spring 181, into the crown to apply pressure thereto. The rotation of the dial carries the pressed crowns over heaters. These are not shown, as they form no part of the present invention.

Sliding in a lower rotating spider 182 are a number of plungers 183 aligned with the pressure plungers 178. They are elevated by means of rollers 184 riding on the cam track 185. During the crown receiving and crown heating portions of the dial's cycle, these plungers are lowered, but as the crowns pass beyond the heaters, the rise of the cam track elevates the corresponding plungers into contact with the crowns. This causes springs 181 to exert additional pressure and allows the heat to dissipate. Before the fingers reach the crown receiving position again, the completed crowns are removed in any suitable manner.

The operation of the apparatus as a whole will be clear from the description of the operation and relation of the several parts, as above set forth.

It is to be understood that the use of the word "crowns" in relation to the feeding of the same, in both specification and claims, is to be taken in the broadest sense, that is, to include crown shells, partly assembled or completed crowns.

What is claimed is:

1. In combination, crown supporting and guiding means, means including a crown-engaging element for feeding a crown along said supporting means with a step by step movement, and other means also including a crown-engaging element for limiting and equalizing the feeding movements of the crown.

2. In combination, crown supporting and guiding means, means including a crown-engaging element for simultaneously feeding a plurality of crowns along said supporting means with a step by step movement and other means also including a crown-engaging element for limiting and equalizing the feeding movements of the several crowns.

3. In combination, crown supporting and guiding means, a plurality of spaced crown-feeding fingers, means for moving said fingers whereby a given crown is successively fed ahead by the several fingers, and other means including a crown-engaging element for limiting and equalizing the feeding movements of the crowns.

4. In combination, crown supporting and guiding means, means for simultaneously feeding a plurality of crowns along said supporting means with a step by step movement, and a plurality of spaced arresting fingers for limiting and equalizing the feeding movements.

5. In combination, crown supporting and guiding means, a plurality of spaced crown feeding fingers, means for moving said fingers whereby a given crown is successively fed ahead by each finger, a plurality of spaced arresting fingers for limiting and equalizing the feeding movements, and means for intermittently interposing said arresting fingers in the path of the crowns.

6. In combination, a track for guiding crowns or the like along a given path, a finger carrying bar, a plurality of spaced crown feeding fingers secured thereto, means for moving the bar with a circular motion to cause a given crown to be successively fed ahead by each finger, a second finger carrying bar, a plurality of spaced arresting fingers secured thereto, and means for reciprocating said second named bar to intermittently interpose said arresting fingers in the path of the crowns.

7. In combination, a track for guiding crowns or the like along a given path, a plurality of spaced crown feeding fingers, means for moving said feeding fingers with a circular motion, a plurality of spaced arresting fingers, means for reciprocating said arresting fingers into and out of the path of the crowns, said two sets of fingers being so related that in their initial positions the fingers of one set are staggered with relation to those of the other set the distance of half a space.

8. In combination, a track for guiding crowns or the like along a given path, a crown feeding device comprising a supporting bar and a plurality of spaced crown engaging fingers and having an orbital movement, a crown arresting device comprising a supporting bar and a plurality of spaced crown engaging fingers and having a reciprocating movement, and means for operating said feeding device and said arresting device with synchronized cycles.

9. In combination, a track for guiding crowns or the like along a given path, a crown feeding device comprising a supporting bar and a plurality of spaced crown engaging fingers, a crown arresting device comprising a supporting bar and a plurality of spaced crown engaging fingers, a pair of rotary shafts, crank arms thereon, a connection between said crank arms and the crown feeding device, whereby the latter is given a circular motion, and a connection between said crank arms and said arresting device, whereby the latter is given a reciprocating motion.

10. In combination, a track for guiding crowns or the like along a given path, a crown feeding device comprising a supporting bar and a plurality of spaced crown engaging fingers, a crown arresting device comprising a supporting bar and a plurality of spaced crown engaging fingers, a pair of rotary shafts, crank arms thereon, a connection between said crank arms and said feeding device for giving the latter a circular motion, and a driving connection between the crank arms and said arresting device including means for converting the circular motion of the crank arms into reciprocating motion in the arresting device.

11. In combination, crown supporting and guiding means, means including a crown-engaging element for simultaneously feeding a plurality of crowns along said supporting means with a step by step movement, other means also including a crown-engaging element for limiting and equalizing the feeding movements of the crowns, and means for inserting a disk of adhesive material in successive crowns between the feeding movements thereof.

12. In combination, crown supporting and guiding means, means including a crown-engaging element for simultaneously feeding a plurality of crowns along said supporting means with a step by step movement, other means also including a crown-engaging element for limiting and equalizing the feeding movements of the crowns, and means for inserting a cork disk in successive crowns between the feeding movements thereof.

13. In combination, crown supporting and guiding means, means for simultaneously feeding a plurality of crowns along said supporting means, means including a crown engaging element for limiting and equalizing the feeding movement of the crowns, a die block beneath said track and over which the crowns are successively fed, a compressing plunger for pressing a crown against said die block, and means for operating said plunger between the feeding movements of the crowns.

14. In combination, a track for guiding crowns or the like along a given path, a vertically reciprocating plunger adapted to be lowered into the skirts of the successive crowns to perform an operation relative thereto, a plurality of spaced crown feeding fingers having an orbital movement for feeding a plurality of crowns along said track with a step by step movement and a plurality of spaced arresting fingers having a reciprocating movement into and out of the path of the crowns.

15. In combination, a track for guiding crowns or the like along a given path, a plurality of reciprocating plungers adapted to be lowered into the skirts of successive crowns to perform an operation with respect thereto, a plurality of spaced crown feeding fingers having an orbital movement for feeding crowns along said track with a step by step movement, a plurality of spaced arresting fingers having a reciprocating movement into and out of the path of the crowns, and means for simultaneously operating said plungers to perform their respective operations between the feeding movements of the crowns.

16. In combination, a track for guiding crowns or the like along a given path, a vertically reciprocating plunger adapted to be lowered into the skirts of the successive crowns to perform an operation relative thereto, a plurality of spaced crown-feeding fingers having an orbital movement for feeding a plurality of crowns along said track with a step by step movement, and other means including a crown-engaging element for limiting and equalizing the feeding movements of the crowns.

17. In combination, a track for guiding crowns or the like along a given path, a plurality of crown feeding fingers, means for moving said fingers whereby a given crown is successively fed ahead by the several fingers, other means for engaging the crowns to limit and equalize the feeding movements thereof, and means for inserting a disk in said crowns between successive feeding movements.

18. In combination, a track for guiding crowns or the like along a given path, a plurality of crown-feeding fingers, means for moving said fingers whereby a given crown is successively fed ahead by the several fingers, a plurality of crown-arresting fingers, means for moving said arresting fingers whereby the several crowns are engaged and held between feeding movements, and means for operating said two finger-moving means in synchronism.

19. In combination, a track for guiding crowns or the like along a given path, a plurality of spaced crown-feeding fingers, means for giving said fingers an orbital movement whereby they are alternately brought up to and withdrawn from a number of crowns, thereby to feed the several crowns forward with a step by step movement, and crown arresting means acting on the crowns while the feeding fingers are withdrawn therefrom.

20. In combination, crown supporting means, a finger carrying bar, a plurality of spaced crown feeding fingers secured thereto, means for giving the bar an orbital movement to cause a given crown to be successively fed ahead by each finger, a second finger carrying bar, a plurality of spaced arresting fingers secured thereto, and means for reciprocating said second bar to interpose intermittently said arresting fingers in the path of the crowns.

21. In combination, crown supporting means, a plurality of spaced crown feeding fingers, means for giving said feeding fingers an orbital movement, a plurality of spaced arresting fingers, means for reciprocating said arresting fingers into and out of the path of the crowns, said two sets of fingers being so related that in their initial positions the fingers of one set are staggered with relation to those of the other set the distance of half a space.

22. In combination, crown supporting means, a vertically reciprocating plunger adapted to be lowered into the skirts of successive crowns to perform an operation relative thereto, a plurality of spaced crown feeding fingers having an orbital movement for feeding a plurality of crowns along said supporting means with a step by step movement, and a plurality of spaced arresting fingers having a reciprocating movement into and out of the path of the crowns.

23. In combination, a track for guiding crowns or the like along a given path, a finger carrying bar, a plurality of spaced crown feeding fingers carried thereby, a block connected with said bar adjacent each end thereof, a crank pin pivoted in each block, cranks on which said pins are mounted, means for operating said cranks whereby the fingers are given an orbital crown feeding movement, a second finger carrying bar, a plurality of spaced crown arresting fingers carried thereby and so related with the feeding fingers as to be staggered half a space with relation to said feeding fingers when the latter are in initial position, a slotted plate adjacent each end of the second bar, a block riding in each slot, pins pivoted in said last-named blocks and mounted in said first-named blocks, a slide block connected with said second bar, a guide track in which said slide block slides, whereby the arresting fingers are given a reciprocating movement into and out of the path of the crowns, a reciprocable plunger for performing an operation with respect to the crowns, and means for lowering said plunger into a crown between feeding movements of the feeding fingers and while the crown is arrested by the arresting fingers.

24. In combination, a track for guiding crowns or the like along a given path, a finger carrying bar, a plurality of spaced crown feeding fingers carried thereby, a block connected with said bar adjacent each end thereof, a crank pin pivoted in each block, cranks on which said pins are mounted, means for operating said cranks whereby the fingers are given an orbital crown feeding movement, a second finger carrying bar, a plurality of spaced crown arresting fingers carried thereby and so related with the feeding fingers as to be staggered half a space with relation to said feeding fingers when the latter are in initial position, a slotted plate adjacent each end of the second bar, a block riding in each slot, pins pivoted in said last-named blocks and mounted in said first-named blocks, a slide block connected with said second bar, and a guide track in which said slide block slides, whereby the arresting fingers are given a reciprocating movement into and out of the path of the crowns.

25. In combination, crown supporting and guiding means, a plurality of spaced crown feeding fingers movable in an orbit to intermittently engage a number of crowns and feed them along said supporting means, a plurality of spaced crown arresting fingers movable into and out of the path of the crowns, and means for so operating said two sets of fingers that the crowns are at all times under the control of at least one set of fingers.

26. In combination, a track for guiding crowns along a given path, a plurality of spaced crown feeding fingers movable in a circular orbit, thereby to intermittently feed a number of crowns along said track, a plurality of spaced crown arresting fingers movable into and out of the path of the crowns, said two sets of fingers being so related that in their initial position the fingers of one set are staggered with relation to those of the other set the distance of half a space, and means for operating said two sets of fingers with synchronized cycles.

27. In combination, crown supporting and guiding means, a plurality of spaced crown feeding fingers movable in a circular orbit to fed crowns along said supporting means with a step by step movement, a plurality of spaced crown arresting fingers movable into and out of the path of the crowns, and means for moving said two sets of fingers in synchronized cycles, the fingers being so arranged that in initial position the fingers of one set are staggered with respect to those of the other set the distance of half a space and when the fingers of one set align with those of the other set the ends of the fingers are so close together that the arresting fingers arrest the crowns as soon as one feeding stroke of the feeding fingers has come to an end and until the next feeding stroke starts.

28. In combination, crown supporting and guiding means, a plurality of crown feeding fingers movable in an orbit to intermittently feed crowns along said supporting means with a step by step movement, a plurality of crown arresting fingers movable into and out of the path of the crowns, the fingers of both sets being spaced a distance substantially equal to the diameter of the crowns to be fed, and means for operating said two sets of fingers with synchronized cycles, whereby the crowns are always under the control of at least one set of fingers.

29. In combination, crown supporting and guiding means, a plurality of crown feeding fingers movable in an orbit to intermittently feed crowns along said supporting means, a plurality of crown arresting fingers movable into and out of the path of the crowns, the fingers of both sets being spaced a distance substantially equal to the diameter of the crowns to be fed, and means for so operating said fingers that the arresting fingers take arresting position as soon as one feeding stroke of the feeding fingers ends and until the next stroke commences.

30. In combination, crown supporting and guiding means, means for moving crowns along said suporting means with a step by step movement, a plurality of crown arresting fingers spaced apart a distance substantially equal to the diameter of the crowns to be fed, and means for interposing said fingers between adjacent crowns between feeding movements.

In testimony whereof, I have hereunto set my hand.

GEORGE GOEBEL.